US012339568B2

(12) United States Patent
Watanabe

(10) Patent No.: US 12,339,568 B2
(45) Date of Patent: Jun. 24, 2025

(54) LENS UNIT AND CAMERA MODULE

(71) Applicant: Maxell, Ltd., Kyoto (JP)

(72) Inventor: Toru Watanabe, Kyoto (JP)

(73) Assignee: MAXELL, LTD., Kyoto (JP)

( * ) Notice: Subject to any disclaimer, the term of this patent is extended or adjusted under 35 U.S.C. 154(b) by 215 days.

(21) Appl. No.: 18/008,449

(22) PCT Filed: Jun. 9, 2021

(86) PCT No.: PCT/JP2021/021896
§ 371 (c)(1),
(2) Date: Dec. 6, 2022

(87) PCT Pub. No.: WO2021/251426
PCT Pub. Date: Dec. 16, 2021

(65) Prior Publication Data
US 2023/0213839 A1 Jul. 6, 2023

(30) Foreign Application Priority Data
Jun. 9, 2020 (JP) .................................. 2020-099992

(51) Int. Cl.
G03B 17/08 (2021.01)
H04N 23/55 (2023.01)

(52) U.S. Cl.
CPC ............. *G03B 17/08* (2013.01); *H04N 23/55* (2023.01)

(58) Field of Classification Search
None
See application file for complete search history.

(56) References Cited

U.S. PATENT DOCUMENTS 5,894,369 A * 4/1999 Akiba ................ G02B 23/2423
600/110
7,418,200 B2 * 8/2008 Imai ........................ G02B 7/08
359/698

(Continued)

FOREIGN PATENT DOCUMENTS

CN 108121043 A * 6/2018
JP 2002-365560 A 12/2002

(Continued)

OTHER PUBLICATIONS

International Search Report and Written Opinion mailed on Aug. 17, 2021, received for PCT Application PCT/JP2021/021896, filed on Jun. 9, 2021, 11 pages including English Translation.

(Continued)

*Primary Examiner* — Rodney E Fuller
(74) *Attorney, Agent, or Firm* — XSENSUS

(57) ABSTRACT

A lens unit including a lens group formed by aligning a plurality of lenses along an optical axis; and a lens barrel having a cylindrical shape and including an inner accommodation space for accommodating and holding the lens group, the lens group including a first lens located to be closest to an object side and a second lens adjacent to the first lens on an image side, the lens unit including an annular body that integrates the first lens and the second lens and that is fit to outer circumferences of the first lens and the second lens to cover a joint portion between the first lens and the second lens from an outside, and the annular body is fit to an inner circumferential surface of the lens barrel, and includes a seal portion for tightly sealing an inside of an inter-lens space.

20 Claims, 3 Drawing Sheets

(56) References Cited

U.S. PATENT DOCUMENTS

| | | | |
|---|---|---|---|
| 2002/0186478 A1* | 12/2002 | Watanabe | G02B 23/243 |
| | | | 359/811 |
| 2006/0238894 A1* | 10/2006 | Sano | G02B 13/0035 |
| | | | 359/714 |
| 2010/0022841 A1 | 1/2010 | Takahashi et al. | |
| 2012/0218649 A1* | 8/2012 | Konishi | G02B 7/021 |
| | | | 156/305 |
| 2017/0255002 A1 | 9/2017 | Yashiro | |

FOREIGN PATENT DOCUMENTS

| | | | | |
|---|---|---|---|---|
| JP | 2010-22617 A | | 2/2010 | |
| JP | 2013-231993 A | | 11/2013 | |
| JP | 2016-106764 A | | 6/2016 | |
| JP | 2018-105904 A | | 7/2018 | |
| JP | 2020134761 A | * | 8/2020 | |
| WO | WO-2016088518 A1 | * | 6/2016 | ......... A61B 1/00096 |

OTHER PUBLICATIONS

Notice of Reasons for Refusal issued Aug. 20, 2024 in Japanese Patent Application No. 2020-099992 with English translation thereof.

\* cited by examiner

LENS UNIT AND CAMERA MODULE

CROSS-REFERENCE TO RELATED APPLICATIONS

The present application is based on PCT filing PCT/JP2021/021896, filed Jun. 9, 2021, which claims priority to JP 2020-099992, filed Jun. 9, 2020, the entire contents of each are incorporated herein by reference.

TECHNICAL FIELD

The present invention relates to a lens unit and a camera module capable of constituting an in-vehicle camera to be mounted on a vehicle such as an automobile.

BACKGROUND ART

An in-vehicle camera has been conventionally mounted on an automobile to support parking and prevent a collision by use of image recognition, and furthermore, attempts have been made to apply it to the automated driving. In addition, a camera module of such an in-vehicle camera or the like generally includes a lens unit including a lens group formed by aligning a plurality of lenses along an optical axis, a lens barrel (barrel) that accommodates and holds the lens group, and a diaphragm member disposed between the lenses in at least one position of the lens group (see, for example, Patent Literature 1).

Further, in particular, in a case where at least a part of the lens unit for an in-vehicle camera is installed outside the vehicle, as illustrated in FIG. 3, in a state in which a lens group L is incorporated, accommodated, and held in an inner accommodation space S of a lens barrel 102, an O-ring 104 is interposed between a first lens 100 located to be closest to an object side of the lens group L and the lens barrel 102 for waterproofing and dustproofing so as to prevent water and dust from entering the lens group L inside the lens barrel 102. In this case, for example, a diameter-reduced portion 100b having a step shape and having a diameter reduced in an image-side part of the lens 100 is provided on an outer circumferential-side surface 100a of the first lens 100, the O-ring 104 is attached to such a diameter-reduced portion 100b, and the O-ring 104 is compressed in the radial direction between the outer circumferential-side surface 100a of the first lens 100 and the inner circumferential surface 102a of the lens barrel 102. Hence, an object-side end portion of the lens barrel 102 is in a sealed state.

Furthermore, regarding the lens barrel 102, in a state in which the lens group L is incorporated, accommodated, and held in its inner accommodation space S, a caulking portion 123 of an end portion on the object side (an upper end portion in FIG. 7) is caulked inward in a radial direction. Accordingly, the first lens 100 is fixed with the object-side end portion of the lens barrel 102 by the caulking portion 123.

CITATION LIST

Patent Literature

Patent Literature 1: JP 2013-231993 A

SUMMARY OF INVENTION

Technical Problem

Even though the waterproofing measure is taken by the O-ring 104 as described above, by the way, moisture (water vapor) may enter the lens unit through various paths. For this reason, when the difference between an outside air temperature and a temperature in the lens unit increases, the water vapor in the lens unit condenses and dew condensation occurs on a lens surface. In particular, dew condensation is likely to occur particularly on a back surface 100c of the first lens 100, in an inter-lens space S1 between the first lens 100 having the largest influence of the temperature difference from the outside and a second lens 101 adjacent to this.

As a factor of the difference between the outside air temperature and the temperature in the lens unit increases, the temperature in the lens unit increases in winter season while the outside air is cold, the temperature in the lens unit rises due to heat transferred from a constantly electrically-conductive image sensor (imaging element) for receiving light condensed through, for example, the lens unit and converting the light into an electric signal, or the first lens 100 is cooled by a surface 100d of the first lens 100 by being exposed to the outside air, rain, or the like, in a state in which the temperature in the lens unit is high due to the heat from the image sensor or a surrounding environment (for example, the engine of the vehicle).

Further, examples of the path that allows water vapor to enter the lens unit may include a path from a gap between the caulking portion 123 of the lens barrel 102 and the first lens 100 through a part of the circumference of the O-ring 104 and a gap between the first lens 100 and the lens barrel 102 and/or the second lens 101 to reach the inter-lens space S1 and the like, or a path through a moisture-permeable resin that forms the lens barrel 102. Furthermore, the image sensor (imaging element) disposed on an image side of the lens unit rises up to around 100 degrees during operation. In such a situation, however, there is another path in which moisture contained in a substrate on which the image sensor is mounted is vaporized and reaches the inter-lens space S1 through a gap between the lens barrel 102 and each lens of the lens group L.

In any case, when the water vapor enters the lens unit through such a path and a temperature difference occurs between the outside air and the inside of the lens unit due to the above-described factor, dew condensation occurs in the inter-lens space S1, particularly on the back surface 100c of the first lens 100, a captured image is blurred, and a desired resolution is not obtainable (visibility is degraded). Therefore, there is a demand for further ensuring airtightness of the lens unit and suppressing the water vapor from entering the inter-lens space S1.

The present invention has been made in view of the above circumstances, and has an object to provide a lens unit and a camera module capable of suppressing water vapor from entering an inter-lens space between a lens located to be closest to an object side and a lens adjacent to this, and preventing dew condensation on a lens surface.

Solution to Problem

In order to address the above issue, in the present invention, a lens unit including: a lens group formed by aligning a plurality of lenses along an optical axis; and a lens barrel having a cylindrical shape and including an inner accommodation space for accommodating and holding the lens group, the lens group including a first lens located to be closest to an object side and a second lens adjacent to the first lens on an image side, the lens unit including an annular body that integrates the first lens and the second lens and that is fit to outer circumferences of the first lens and the second lens to cover a joint portion between the first lens and the second lens from an outside, in which the annular body is fit to an inner circumferential surface of the lens barrel, and includes a seal portion for tightly sealing an inside of an inter-lens space between the first lens and the second lens against the outside.

According to the above configuration of the present invention, the first lens and the second lens are integrated by the annular body that is fit to the outer circumferences of the first lens and the second lens, and the joint portion between the first lens and the second lens is covered (closed) from the outside. Therefore, the annular body is capable of blocking water vapor that is likely to enter an inter-lens space between the first lens and the second lens through a path from the outside of the lens barrel toward the inside of the lens barrel and a path in the inner accommodation space of the lens barrel, particularly, a path from the substrate, on which an image sensor (imaging element) disposed on the image side of the lens unit is mounted, toward the object side through a gap between the lens barrel and each lens of the lens groups L. Moreover, the annular body is provided with the seal portion for tightly sealing the inside of the inter-lens space between the first lens and the second lens against the outside. Therefore, even under a high-humidity environment, water vapor can be suppressed from entering the inter-lens space (by improving airtightness), the amount of water vapor in the inter-lens space can be reduced, and dew condensation on a lens surface, particularly, dew condensation can be suppressed from occurring on an image-side front surface (back surface) of the first lens. Therefore, degradation in visibility that a captured image is blurred and a desired resolution is not obtainable can be prevented. In addition, in a case where the first and second lenses can be integrated into a unit by the annular body in this manner, an airtightness test (a test for checking a tightly sealed state (anti-fog performance)) in the inter-lens space for such a unit alone can also be conducted, that is, before the entire lens unit is assembled rather than after it is assembled.

Note that the annular body may be made of metal or resin, but is preferably made of metal. This is because in a case where the annular body is formed of resin, degradation in the anti-fog performance due to the hygroscopic characteristic is concerned. However, in a case where the annular body is formed of metal, such degradation in the anti-fog performance can be suppressed.

In addition, in the above configuration, preferably, the seal portion includes a seal member and/or an adhesive to be interposed between an inner surface of the annular body and an outer surface of the first lens and between the inner surface of the annular body and an outer surface of the second lens to keep airtight between them. According to this, the airtight state by the seal portion is effectively and easily achievable, and the water vapor can be reliably prevented from entering the inter-lens space through the gap between the annular body and the first and second lenses. Note that examples of the seal member may include an O-ring and a gasket, and examples of the adhesive may include an adhesive for ensuring airtightness, for example, an epoxy-based adhesive.

In addition, in the above configuration, preferably, the seal portion includes a blocking wall portion having an annular shape for blocking warm air containing water vapor that flows from the image side to the object side in the inner accommodation space. According to this, the warm air containing the water vapor that flows from the image side to the object side in the inner accommodation space is blocked by the blocking wall portion. Therefore, it is needless to say that the water vapor can be suppressed from entering the inter-lens space so as to reduce a water vapor amount in the inter-lens space, and an increase in difference between the outside air temperature and the temperature in the lens unit can be avoided. In particular, a temperature change in the inter-lens space can be moderated. Therefore, dew condensation can be effectively prevented from occurring particularly on the back surface of the first lens in the inter-lens space.

In addition, in the above configuration, preferably, the blocking wall portion also serves as a spacer to be interposed between the second lens and a third lens adjacent to the second lens on the image side, and to separate these lenses from each other in an optical axis direction. According to this, the blocking wall portion also serves as a spacer that separates the second lens and the third lens in the optical axis direction. Therefore, the above-described two functions of the temperature difference suppressing function and the spacer function are achievable only by a part of the annular body to be the blocking wall portion. This contributes to a decrease in the number of component parts of the lens unit, and is particularly advantageous in the inner accommodation space in which the space is limited.

In addition, in the above configuration, preferably, the seal portion includes a seal member and/or an adhesive to be interposed between the blocking wall portion and the second lens and/or the third lens to keep airtight between them. According to this, airtightness can also be ensured in a water vapor flow path, to which the second lens and/or the third lens is related, and airtightness performance for suppressing the water vapor from entering the inter-lens space can be further improved.

In addition, in the above configuration, preferably, an adhesive for keeping airtightness is interposed between an outer surface of the annular body and an inner surface of the lens barrel. According to this, the airtight adhesive is capable of simultaneously blocking the flow of water from the outside of the lens barrel toward the inside of the inner accommodation space of the lens barrel and the flow of warm air from the image side (image sensor side) toward the object side in the inner accommodation space.

Further, a camera module according to the present invention includes the above lens unit.

According to such a configuration, the functions and effects of the above-described lens unit are obtainable by the camera module.

Advantageous Effects of Invention

According to the present invention, a first lens and a second lens are integrated by an annular body that is fit to outer circumferences of the first lens and the second lens, a joint portion between the first lens and the second lens is covered from the outside, and a seal portion for tightly sealing the inside of an inter-lens space between the first lens and the second lens against the outside is provided in the annular body. Therefore, water vapor can be suppressed from entering the inter-lens space between the first lens and the second lens, and dew condensation on a lens surface can be prevented.

DESCRIPTION OF EMBODIMENTS

Hereinafter, embodiments of the present invention will be described with reference to the drawings.

Note that a lens unit in the present embodiment to be described below is particularly used for a camera module such as an in-vehicle camera, and, for example, is fixed and installed on an outer surface side of an automobile, and its wiring is drawn into the automobile and is connected with a display or other apparatuses. In addition, in FIGS. 1 to 3, hatching is omitted for a plurality of lenses.

Figure 1:
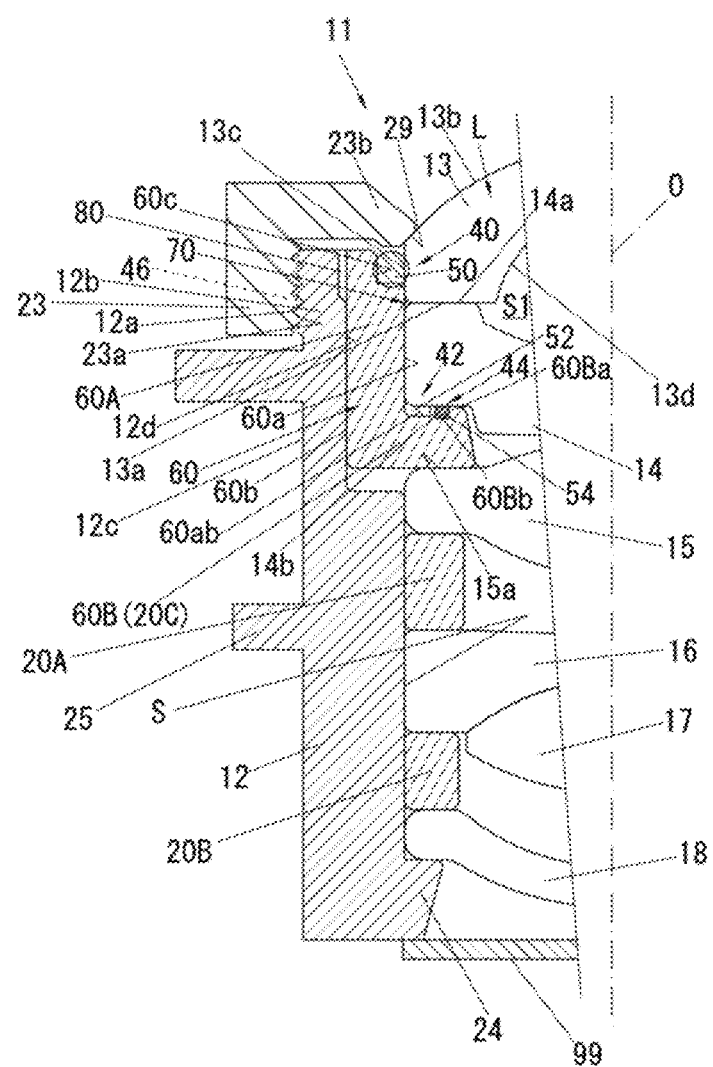
FIG. 1 is a schematic half cross-sectional view of a lens unit according to an embodiment of the present invention.

FIG. 1 illustrates a lens unit 11 according to an embodiment of the present invention. As illustrated, the lens unit 11 in the present embodiment includes, for example, a lens barrel (barrel) 12 having a cylindrical shape (in the present embodiment, an inner circumferential surface is circular) and made of metal, and a plurality of lenses (an outer circumferential surface is circular) disposed in an inner accommodation space S of the lens barrel 12. They are, for example, six lenses including a first lens 13, a second lens 14, a third lens 15, a fourth lens 16, a fifth lens 17, and a sixth lens 18 from an object side. These lenses 13 to 18 are incorporated in the lens barrel 12 to be stacked with spacers 20A, 20B, and 20C interposed between them. An in-vehicle camera including such a lens unit 11 includes the lens unit 11, a substrate including an image sensor, not illustrated, and an installation member, not illustrated, for installing the substrate on a vehicle such as an automobile. Note that, in the present embodiment, the spacers 20A, 20B, and 20C may also function as a "light-shielding diaphragm" for shielding light beams that cause a ghost and light beams that cause an aberration, and an "aperture diaphragm" for limiting the amount of transmitted light and determining an F value, which is an index of brightness.

The plurality of lenses 13, 14, 15, 16, 17, and 18 incorporated, accommodated, and held in the inner accommodation space S of the lens barrel 12 are stacked and disposed in a state in which the respective optical axes are in alignment with one another, and the respective lenses 13, 14, 15, 16, 17, and 18 are aligned along one optical axis O, and constitute a group that is a lens group L used for imaging. In this case, the lenses 13, 14, 15, 16, 17, and 18 constituting the lens group L are all made of glass, but are not necessarily made of glass. Some of them may be made of glass, some of them may be made of resin, or all of them may be made of resin. In addition, in the present embodiment, two lenses that are the fourth and fifth lenses 16 and 17 positioned on the image side are bonded lenses, but are not necessarily the bonded lenses. Further, in the present embodiment, the lens barrel 12 is made of metal as described above, but may be made of resin. Note that an antireflection film, a hydrophilic film, a water-repellent film, or the like is provided on the surfaces of these lenses 13, 14, 15, 16, 17, and 18, as necessary.

A cap 23, as a fastening and fixing member, having a substantially cylindrical shape is screwed to and attached to an object-side end portion 12b (an upper end portion in FIG. 1) of the lens barrel 12, and the first lens 13, which is located to be closest to the object side, is fixed to the object-side end portion 12b of the lens barrel 12 by the cap 23. Specifically, in the cap 23, a female screw portion 23a, which is formed on an inner circumferential surface of its circumferential side wall, is screwed to a male screw portion 12a, which is formed on an outer circumferential surface of an object-side end portion 12b of the lens barrel 12, and a tapered end surface 29 of a circumferential end edge portion 23b on an inner side in the radial direction of its upper end having a flange shape is made to abut a surface 13b, facing the object side, of the first lens 13. Such a cap 23 is fastened, and thus the first lens 13 is fixed to the object-side end portion 12b, and the lens group L is held in the lens barrel 12 in the optical axis direction.

In addition, an inner flange portion 24, which includes an opening portion smaller in outer diameter than the sixth lens 18, is provided at an end portion (a lower end portion in FIG. 1) on the image side of the lens barrel 12. The plurality of lenses 13, 14, 15, 16, 17, and 18 constituting the lens group L and the spacers 20A, 20B, and 20C are sandwiched and held in the optical axis direction between the inner flange portion 24 and the cap 23. Note that an outer flange portion 25, which is used for installing the lens barrel 12 in the in-vehicle camera, is provided in a flange shape on an outer circumferential surface of the lens barrel 12 on the image side.

Figure 2:
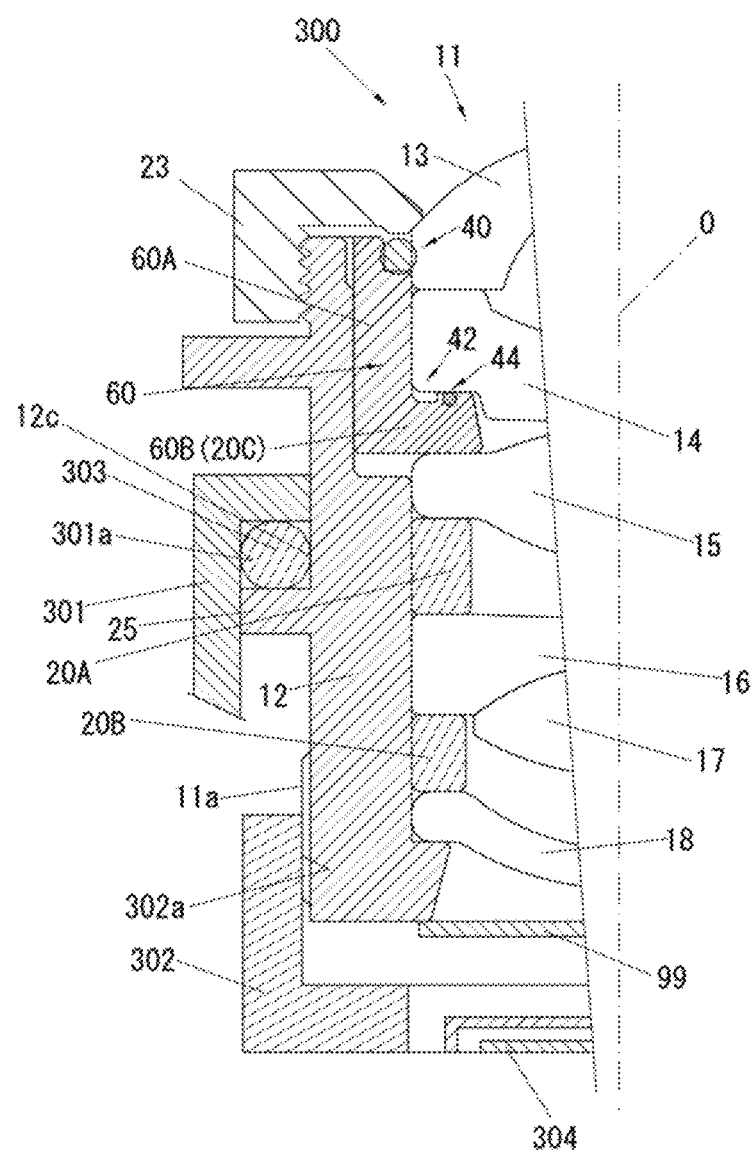
FIG. 2 is a schematic half cross-sectional view of a camera module including the lens unit of FIG. 1.
Figure 3:
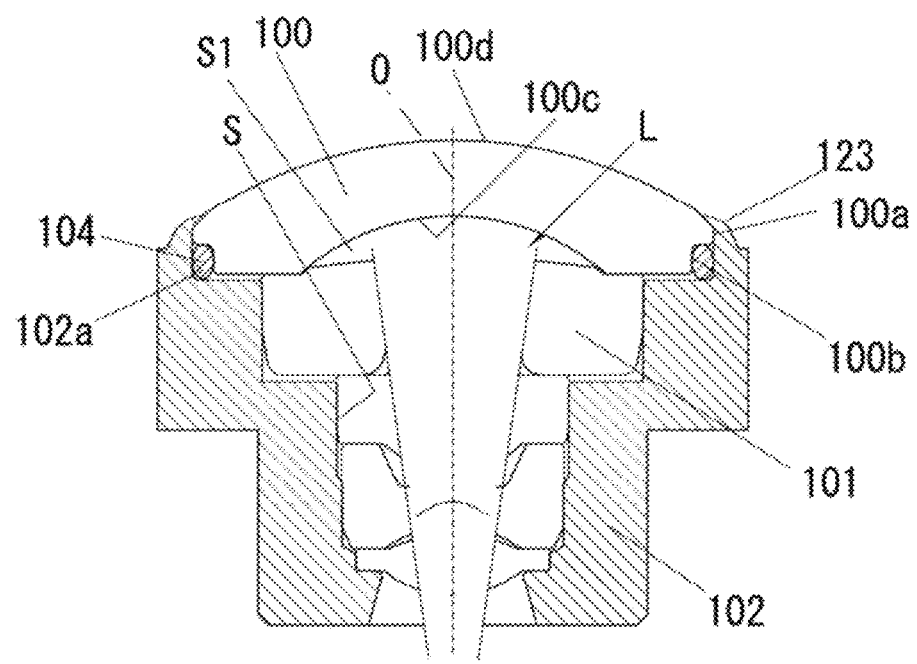
FIG. 3 is a schematic cross-sectional view illustrating an example of a conventional lens unit.

FIG. 2 is a schematic cross-sectional view of a camera module 300, in the present embodiment, including the lens unit 11 having the above-described configuration. As illustrated, the camera module 300 includes the lens unit 11 of FIG. 1, to which a filter 99 is attached.

The camera module 300 includes an upper case (camera case) 301, which is an exterior component part, and a mount (pedestal) 302, which holds the lens unit 11. In addition, the camera module 300 includes a seal member 303 and an image sensor (imaging element) 304, which is packaged.

The upper case 301 is a member that exposes an end portion on the object side of the lens unit 11 and that also covers another portion. The mount 302 is disposed inside the upper case 301, and includes a female screw 302a to be screwed to a male screw 11a of the lens unit 11. The seal member 303 is a member interposed between the inner surface 301a of the upper case 301 and the outer circumferential surface 12c of the lens barrel 12 of the lens unit 11, and is a member for maintaining airtightness inside the upper case 301.

The image sensor 304 is disposed inside the mount 302, and is disposed at a position of receiving an image of an object to be formed by the lens unit 11. In addition, the image sensor 304 includes a CCD, a CMOS, or the like, and converts light, which has been condensed through the lens unit 11, and which has arrived, into an electric signal. The converted electric signal is converted into analog data or digital data that are components of data of an image that has been captured by the camera.

In the lens unit 11 and the camera module 300 having the above-described configurations, the first lens 13 located to be closest to the object side and the second lens 14 adjacent to the first lens 13 on the image side have respective annular abutment surfaces (facing surfaces) 13a and 14a, which face each other in the optical axis direction, and which abut each other. These abutment surfaces 13a and 14a form a joint portion 70 between the first lens 13 and the second lens 14. In addition, the first lens 13 and the second lens 14 form an inter-lens space S1 between them. Here, as described above, there are various paths that allow water vapor to enter the inter-lens space S1. However, in order to prevent degradation in visibility that dew condensation occurs particularly on a back surface 13d of the first lens 13 in the inter-lens space S1, the captured image is blurred, and a desired resolution is not obtainable, there is a demand for suppressing water vapor from entering the inter-lens space S1. However, there is a possibility that moisture enters the inside of the lens barrel 12 through a path from the outside of the lens barrel 12 toward the inside of the lens barrel 12, particularly through a gap between the lens barrel 12 and the first lens 13. In addition, as in the present embodiment, in a case of an assembly form in which the lenses 13, 14, 15, 16, 17, and 18 made of glass are fit into the lens barrel 12 made of metal, there is a slight gap for enabling the fitting between the lens barrel 12 and the lenses 13, 14, 15, 16, 17, and 18. Hence, through such a gap, or as another embodiment that is not illustrated, in a case where the lens makes point contact with the lens barrel 12 in the circumferential direction inside a cross-section perpendicular to the optical axis direction (that is, in the cross-section perpendicular to the optical axis direction, the inner circumferential surface of the lens barrel 12 has a polygonal shape and the lens has a circular shape, or point contact is made with a protruding rib provided on the inner circumference of the lens barrel 12) and thus forms a gap with the inner surface of the lens barrel 12 in the radial direction (therefore, a communication path continuously extending along the optical axis direction), through such a gap, the moisture contained in the substrate of the image sensor 304 (see FIG. 2) that is constantly electrically-conductive is vaporized by heating of the substrate can enter the inner accommodation space S.

Therefore, in the present embodiment, a structure capable of blocking water vapor that is likely to enter the inter-lens space S1 through such various conceivable paths is provided. Hereinafter, this will be described in detail.

The lens unit 11 and the camera module 300 having the above-described configurations include an annular body 60, which is made of metal, which integrates the first lens 13 and the second lens 14, and which is fit to the outer circumferences of the first lens 13 and the second lens 14 to cover the joint portion 70 between the first lens 13 and the second lens 14 from the outside. That is, in the present embodiment, the first lens 13, the second lens 14, and the annular body 60 are configured as one unit. In this case, the annular body 60 includes: a first extension portion 60A, which extends in the optical axis direction along the outer circumferential side surfaces of the first and second lenses 13 and 14 so as to close the outer end edges in the radial direction of the abutment surfaces 13*a* and 14*a*, which form the joint portion 70, against the outside; and a second extension portion 60B, which is interposed between the second lens 14 and the third lens 15 adjacent to the second lens 14 on the image side, and which extends inward in the radial direction from the image-side end portion of the first extension portion 60A so as to form the above-described spacer 20C for separating the lenses 14 and 15 in the optical axis direction. The annular body 60 is fit to the inner circumferential surface 12*d* of the lens barrel 12, and includes a plurality of seal portions for tightly sealing the inside of the inter-lens space S1 between the first lens 13 and the second lens 14 against the outside.

Specifically, a first seal portion is formed by the second extension portion 60B, which also serves as the spacer 20C. Such a second extension portion 60B extends in the radial direction along a surface 14*b* of the second lens 14, which faces the image side, and forms a blocking wall portion having an annular shape for blocking warm air including water vapor that flows from the image side to the object side through a gap between the lens barrel 12 and the lens in the inner accommodation space S. In addition, the blocking wall portion has an abutment portion 60Ba, which abuts the surface 14*b* of the second lens 14.

In addition, a second seal portion 40 includes an O-ring 50 as a seal member to be interposed between an inner surface 60*a* of the annular body 60 and an outer circumferential side surface 13*c* of the first lens 13 to keep airtight between them. In this case, the O-ring 50 is fit into a step portion 60*c* formed at the object-side end portion of the inner surface 60*a* of the first extension portion 60A of the annular body 60, is compressed in the radial direction between the outer circumferential side surface 13*c* of the first lens 13 and the inner surface 60*a* of the annular body 60 to seal between them, and thus prevents fine particles such as water and dust from entering the inside of the annular body 60 from the object-side end portion of the lens unit 11. Note that an airtight adhesive may be used instead of the O-ring 50.

Further, a third seal portion 42 includes an adhesive 52, which is interposed between the inner surface 60*a* of the annular body 60 and the outer surface (a surface facing the image side) 14*b* of the second lens 14 to keep airtight between them. In this case, the adhesive 52 is filled in a recess 60*ab*, which is formed on the inner surface 60*a* of the second extension portion 60B of the annular body 60. Note that a seal member such as an O-ring may be used instead of the adhesive 52. In addition, the adhesive 52 may be interposed between the outer circumferential side surface of the second lens 14 and the inner surface 60*a* of the first extension portion 60A of the annular body 60.

Further, a fourth seal portion 44 includes an O-ring 54 as a seal member to be interposed between the second extension portion 60B, which also serves as the blocking wall portion as well as the spacer 20C, and the surface 14*b* of the second lens 14, which faces the image side to keep airtight between them. In this case, the O-ring 54 is fit into a step portion 60Bb, which is formed on an inner surface (a surface facing the object side) of the second extension portion 60B of the annular body 60. Although not illustrated, alternatively or additionally to this, an O-ring as a seal member to be interposed between the second extension portion 60B and a surface 15*a* of the third lens 15, which faces the object side to keep airtight between them, may be provided as a fourth seal portion or additional seal portion. In this case, the O-ring is fit into a step portion formed on the outer surface (a surface facing the image side) of the second extension portion 60B of the annular body 60. Note that an airtight adhesive may be used instead of the O-ring 54.

In addition, in the present embodiment, an adhesive 80 for keeping airtight is interposed between an outer surface 60*b* of the annular body 60 and the inner circumferential surface 12*d* of the lens barrel 12. According to this, the airtight adhesive 80 is capable of simultaneously blocking the flow of water from the outside of the lens barrel 12 toward the inside of the inner accommodation space S of the lens barrel 12 and the flow of warm air from the image side (image sensor 304 side) toward the object side in the inner accommodation space S. Note that in addition to such an adhesive 80, a drain passage 46 may be formed in the screw portions 12*a* and 23*a*, which are screw portions between the cap 23 and the lens barrel 12, so as to release the flow of water from the outside of the lens barrel 12 toward the inside of the inner accommodation space S of the lens barrel 12 to the outside again.

As described heretofore, according to the present embodiment, the first lens 13 and the second lens 14 are integrated by the annular body 60, which is fit to the outer circumferences of the first and second lenses 13 and 14, and the joint portion 70 between the first lens 13 and the second lens 14 is covered (closed) from the outside. Therefore, the annular body 60 is capable of blocking water vapor that is likely to enter the inter-lens space S1 between the first lens 13 and the second lens 14 through a path from the outside of the lens barrel 12 toward the inside of the lens barrel 12 and a path in the inner accommodation space S of the lens barrel 12, particularly, a path from the substrate, on which the image sensor (imaging element) 304 disposed on the image side of the lens unit 11 is mounted, toward the object side through a gap between the lens barrel 12 and each lens of the lens group L. Moreover, the annular body 60 is provided with the seal portions 40, 42, 44, and 60B for tightly sealing the inside of the inter-lens space S1 between the first lens 13 and the second lens 14 against the outside. Therefore, even under a high-humidity environment, water vapor can be suppressed from entering the inter-lens space S1 (while improving the airtightness), the water vapor amount in the inter-lens space S1 can be reduced, and dew condensation can be suppressed from occurring on the lens surface, particularly on the surface (back surface) 13d on the image side of the first lens 13. Therefore, degradation in visibility that a captured image is blurred and a desired resolution is not obtainable can be prevented. In addition, in a case where the first and second lenses 13 and 14 can be integrated into a unit by the annular body 60 in this manner, it is also possible to conduct an airtightness test (a test for checking a tightly sealed state (anti-fog performance)) in the inter-lens space S1 for such a unit alone, that is, before the entire lens unit 11 is assembled rather than after it is assembled.

Further, in the present embodiment, the annular body 60 is formed of metal, and thus degradation in anti-fog performance due to hygroscopic characteristic like resin can be suppressed.

In addition, in the present embodiment, the annular body 60 includes the second and third seal portions 40 and 42 having the seal member 50 and/or the adhesive 52 interposed between the inner surface 60a of the annular body 60 and the outer surface of the first lens 13 and between the inner surface 60a of the annular body 60 and the outer surface of the second lens 14 to keep airtight between them. Therefore, the airtight state is effectively and easily achievable, and water vapor is reliably prevented from entering the inter-lens space S1 through the gap between the annular body 60 and the first and second lenses 13 and 14.

Further, in the present embodiment, the annular body 60 includes the blocking wall portion 60B having an annular shape as the first seal portion for blocking the warm air including the water vapor that flows from the image side to the object side in the inner accommodation space S. Therefore, it is needless to say that the water vapor can be suppressed from entering the inter-lens space S1 and the water vapor amount in the inter-lens space S1 can be reduced. An increase in difference between the outside air temperature and the temperature in the lens unit 11 can be avoided. In particular, the temperature change in the inter-lens space S1 can be moderated. Therefore, dew condensation can be effectively prevented from occurring particularly on the back surface 13d of the first lens 13 in the inter-lens space S1.

In addition, in the present embodiment, the blocking wall portion 60B, which is interposed between the second lens 14 and the third lens 15, and which also serves as the spacer 20C for separating these lenses 14 and 15 from each other in the optical axis direction. Therefore, the above-described two functions of the temperature difference suppressing function and the spacer function are achievable only by a part of the annular body 60 as the blocking wall portion. This contributes to a decrease in the number of component parts of the lens unit 11, and is particularly advantageous in the inner accommodation space S in which the space is limited.

Further, in the present embodiment, the annular body 60 includes the fourth seal portion 44 including the seal member 54, which is interposed between the blocking wall portion 60B and the second lens 14 (in another embodiment, not illustrated, the second lens 14 and/or the third lens 15) to keep airtight between them. Therefore, airtightness can also be ensured in a water vapor flow path, to which the second lens 14 (and/or the third lens 15) is related, and airtightness performance for suppressing the water vapor from entering the inter-lens space S1 can be further improved.

Note that the present invention is not limited to the above-described embodiments, and various modifications can be made without departing from its gist. For example, in the present invention, the shapes of the lens, the lens barrel, the annular body, and the like are not limited to the above-described embodiments. In addition, in the above-described embodiments, the first lens is fixed to the object side of the lens barrel by the cap that is a fastening member. However, in a case where the lens barrel is formed of resin, the first lens may be fixed to the object side of the lens barrel by the caulking portion at the object-side end portion of the lens barrel that is caulked inward in the radial direction. Further, a part or all of the above-described embodiments may be combined, or a part of the configuration may be omitted from one of the above-described embodiments without departing from the gist of the present invention.

REFERENCE SIGNS LIST

11 Lens unit
12 Lens barrel
13 First lens
14 Second lens
15 Third lens
40, 42, 44 Seal portion
50, 54 Seal member
52, 80 Adhesive
60 Annular body
60B Blocking wall portion (spacer, seal portion)
70 Joint portion
300 Camera module
L Lens group
O Optical axis
S Inner accommodation space
S1 Inter-lens space

The invention claimed is:

1. A lens unit comprising: a lens group formed by aligning a plurality of lenses along an optical axis; and a lens barrel having a cylindrical shape and including an inner accommodation space for accommodating and holding the lens group, the lens group including a first lens located to be closest to an object side and a second lens adjacent to the first lens on an image side, the lens unit comprising
an annular body that integrates the first lens and the second lens and that is fit to outer circumferences of the first lens and the second lens to cover a joint portion between the first lens and the second lens from an outside, wherein
the annular body is fit to an inner circumferential surface of the lens barrel, and includes
a first extension portion that extends in a direction of the optical axis along outer circumferential side surfaces of the first and second lenses,
a second extension portion between the second lens and a third lens adjacent to the second lens on the image side, wherein the second extension portion extends inward in a radial direction from an image-side end portion of the first extension portion, a first seal for between the first lens and the first extension portion of the annular body, and a second seal between the second lens and the second extension portion of the annular body.

2. The lens unit according to claim 1, wherein the second extension portion includes a blocking wall portion having an annular shape for blocking warm air containing water vapor that flows from the image side to the object side in the inner accommodation space.

3. The lens unit according to claim 2, wherein the blocking wall portion also serves as a spacer to be interposed between the second lens and the third lens, and to separate these lenses from each other in an optical axis direction.

4. The lens unit according to claim 3, wherein the second seal is between the blocking wall portion and the second lens.

5. The lens unit according to claim 1, wherein an adhesive for keeping airtightness is interposed between an outer surface of the annular body and an inner surface of the lens barrel.

6. A camera module comprising the lens unit according to claim 1.

7. The lens unit according to claim 1, wherein at least one of the first and second seals is an adhesive.

8. The lens unit according to claim 7, wherein at least another one of the first and second seals is a gasket.

9. The lens unit according to claim 1, wherein at least one of the first and second seals is a gasket.

10. The lens unit according to claim 1, wherein the first extension portion includes a ledge facing the first lens on which the first seal is provided.

11. The lens unit according to claim 1, wherein the second extension portion includes a step facing an object side of the second lens in which the second seal is provided.

12. The lens unit according to claim 1, wherein the annular body is metal.

13. The lens unit according to claim 1, further comprising a third seal between an inner surface of the second extension portion and the second lens.

14. The lens unit according to claim 13, wherein the second extension portion includes a recess where the second extension portion extends from the first extension portion in which the third seal is provided.

15. The lens unit according to claim 1, further comprising a cap secured to an object-side end portion of the lens barrel and extending in the direction of the optical axis along the lens barrel.

16. The lens unit according to claim 15, further comprising a drain passage between the cap and the lens barrel.

17. The lens unit according to claim 15, wherein the lens barrel includes a flange that extends radially outward from an outer surface of the lens barrel further than the cap.

18. The lens unit according to claim 1, wherein the second lens directly abuts the first lens.

19. The lens unit according to claim 18, wherein the joint portion faces the first extension.

20. The lens unit according to claim 19, wherein the joint portion is below the first seal.

* * * * *